(12) United States Patent
Chen et al.

(10) Patent No.: US 10,289,289 B2
(45) Date of Patent: May 14, 2019

(54) TECHNIQUES FOR AUTHORING VIEW POINTS, VIEW PATHS, AND VIEW SURFACES FOR 3D MODELS

(71) Applicant: AUTODESK, INC., San Rafael, CA (US)

(72) Inventors: Hsiang-Ting Chen, Taichung (TW); Tovi Grossman, Toronto (CA); Wei Li-Yi, Toronto (CA); Ryan Michael Schmidt, Toronto (CA); Bjoern Hartmann, San Francisco, CA (US); George Fitzmaurice, Toronto (CA); Maneesh Agrawala, Oakland, CA (US)

(73) Assignee: AUTODESK, INC., San Rafael, CA (US)

(*) Notice: Subject to any disclaimer, the term of this patent is extended or adjusted under 35 U.S.C. 154(b) by 739 days.

(21) Appl. No.: 14/561,116

(22) Filed: Dec. 4, 2014

(65) Prior Publication Data
US 2015/0160796 A1    Jun. 11, 2015

Related U.S. Application Data

(60) Provisional application No. 61/911,947, filed on Dec. 4, 2013.

(51) Int. Cl.
*G06F 3/0481* (2013.01)
*G06F 3/0484* (2013.01)

(52) U.S. Cl.
CPC ...... *G06F 3/04845* (2013.01); *G06F 3/04815* (2013.01)

(58) Field of Classification Search
CPC .... G06F 3/0482; G06F 3/0481; G06F 3/0484; G06T 19/00
See application file for complete search history.

(56) References Cited

U.S. PATENT DOCUMENTS

| 6,509,906 B1* | 1/2003 | Awe ................... G06T 19/20 345/589 |
| 9,019,270 B2* | 4/2015 | Chen .................. G06T 15/20 345/420 |

(Continued)

OTHER PUBLICATIONS

Agarwala, et al., "Interactive digital photomontage", ACM Trans. Graph. 23, 3, 2004, pp. 294-302.

(Continued)

*Primary Examiner* — Dino Kujundzic
(74) *Attorney, Agent, or Firm* — Artegis Law Group, LLP

(57) ABSTRACT

Techniques for managing authored views. The techniques includes displaying a main window including a model, an authoring panel configured for displaying authored view indicators associated with authored views of the model, and a navigation panel configured for displaying thumbnail representations of authored views associated with the model. The techniques also include based on a user input, accessing an authored view of the model, wherein the authored view includes one of a view-point, a view path and a view surface. The techniques further include displaying the authored view in the main window, an authored view indicator associated with the authored view in the authoring panel, and a thumbnail representation based on the authored view in the navigation panel.

20 Claims, 11 Drawing Sheets

(56) References Cited

U.S. PATENT DOCUMENTS

| | | | | |
|---|---|---|---|---|
| 2002/0198611 | A1* | 12/2002 | Stejskal | G06T 19/00 700/86 |
| 2007/0211149 | A1* | 9/2007 | Burtnyk | G11B 27/034 348/208.4 |
| 2008/0018645 | A1* | 1/2008 | Dwyer | G06T 7/0012 345/424 |
| 2008/0238916 | A1* | 10/2008 | Ghosh | G06F 3/04815 345/419 |
| 2009/0100366 | A1* | 4/2009 | Fitzmaurice | G06F 3/04815 715/767 |
| 2014/0253541 | A1* | 9/2014 | Schmidt | G06T 19/20 345/419 |

OTHER PUBLICATIONS

Burtnyk, et al., "ShowMotion: Camera Motion based 3d Design Review", ACM I3D, 2006, pp. 167-174.

Burtnyk, et al., "StyleCam: Interactive Stylized 3d Navigation using Integrated Spatial & Temporal Controls", ACM UIST, 2002, pp. 101-110.

Chen, et al., "Nonlinear Revision Control for Images", ACM Trans. Graph. 30, 4, Article 105, 2011.

Chen, et al., "Schelling points on 3D surface meshes", ACM SIGGRAPH, Article 29, 2012.

Chi, et al., "MixT: Automatic generation of step-bystep mixed media tutorials", ACM UIST, 2012, pp. 1499-1504.

Christie et al., "Camera control in computer graphics: models, techniques and applications", ACM SIGGRAPH ASIA Courses. 2009, pp. 3:1-3:197.

Denning, et al., "Meshflow: Interactive visualization of mesh construction sequences", ACM Trans. Graph. 30, 4, Article 66, 2011.

Denning et al., "Meshgit: diffing and merging meshes for polygonal modeling", ACM Trans. Graph. 32, 4, Article 35, 2013.

Feixas, et al., "A Unified information-theoretic framework for viewpoint selection and mesh saliency", ACM Trans. Appl. Percept., 6(1):1, pp. 1-1:23.

Fitzmaurice, et al., "Safe 3D Navigation", In Proc. ACM I3D, 2008, pp. 7-15.

Fogarty, et al., "Aesthetic information collages: generating decorative displays that contain information", ACM UIST, 2001, pp. 141-150.

Gal, et al., "3D collage: expressive non-realistic modeling", ACM NPAR,. 2007, pp. 7-14.

Grabler, et al., "Generating photo manipulation tutorials by demonstration", ACM Trans. Graph. 28, 3, Article 66, 2009, pp. 66:1-66:9.

Grossman, et al., "Chronicle: Capture, exploration, and playback of document workflow histories", ACM UIST, 2010, pp. 143-152.

Khan, et al., "HoverCam: interactive 3D navigation for proximal object inspection", I3D, 2005, pp. 73-80.

Kim, et al., "Exploring collections of 3D models using fuzzy correspondences", ACM Trans. Graph. 31, 4, Article 54, 2012.

Kim, et al., "Interactive mosaic generation for video navigation", MULTIMEDIA, 2006, pp. 655-658.

Kirk, et al., "Understanding photowork", ACM CHI, 2006, pp. 761-770.

Koller, et al., "Protected interactive 3d graphics via remote rendering", ACM SIGGRAPH, pp. 695-703.

Laga, "Supervised learning of salient 2d views of 3d models." Journal of the Society for Art and Science. 7(4), 2008, pp. 124-131.

Lee, et al., "Mesh saliency", ACM Trans. Graph. 24, 3, 2005, pp. 659-666.

Rother, et al., "AutoCollage", ACM SIGGRAPH, 2006, pp. 847-852.

Rubinstein, et al., "A comparative study of image retargeting", SIGGRAPH ASIA. Article 160, 2010.

Schmidt et al., MeshMixer: an interface for rapid mesh composition. ACM SIGGRAPH Talks, Article 6, 2010.

Schmidt, et al., "Sketching and Composing Widgets for 3D Manipulation", Computer. Graph. Forum, 27(2), 2008, pp. 301-310.

Secord, et al., "Perceptual models of viewpoint preference", ACM Trans. Graph. 30, 5, Article 109, 2011.

Shilane et al., "Distinctive regions of 3d surfaces", ACM Trans. Graph. 26, 2, Article 7, 2007.

Singh et al., "Visualizing 3d scenes using non-linear projections and data mining of previous camera movements", AFRIGRAPH, 2004, pp. 41-48.

Tsang, et al., "Boom chameleon: simultaneous capture of 3D viewpoint, voice and gesture annotations on a spatially-aware display", ACM UIST. 2002, pp. 111-120.

Tsang, et al., "Temporal thumbnails: rapid visualization of time-based viewing data", AVI, 2004, pp. 175-178.

Wang, et al., "Picture Collage", IEEE CVPR, 2006, pp. 347-354.

Xiao, et al., "Mixed-initiative photo collage authoring", Multimedia, 2008, pp. 509-518.

Yamauchi, et al., "Towards stable and salient multi-view representation of 3d shapes", IEEE SMI, 2006, pp. 40-48.

* cited by examiner

TECHNIQUES FOR AUTHORING VIEW POINTS, VIEW PATHS, AND VIEW SURFACES FOR 3D MODELS

CROSS-REFERENCE TO RELATED APPLICATIONS

This application claims the priority benefit of U.S. provisional patent application Ser. No. 61/911,947, filed Dec. 4, 2013, and titled, "TECHNIQUES FOR SHOWCASING THREE-DIMENSIONAL MODELS." The subject matter of this related application is hereby incorporated herein by reference.

BACKGROUND OF THE INVENTION

Field of the Invention

The invention relates generally to complex three-dimensional modeling on computers and, more specifically, to techniques for authoring view-points, view paths, and view surfaces for three-dimensional (3D) models.

Description of the Related Art

In recent years, the advancement of 3D modeling software has resulting in an abundance of 3D model libraries and an abundance of users wishing to understand proper modeling processes. To help such users understand proper modeling processes, many users showcase their work through a collection of static view-points (fixed, "prescribed" camera positions) across version of the model or by authoring animated "fly-throughs," (prescribed paths through which a camera is moved to view a model). However, manual creation of such content is generally very time-consuming.

Many automated view-point selection techniques exist that can allow for easier creation of view-points. However, these techniques typically only consider a final version of a 3D model rather than intermediate versions of the model that only exist while editing the 3D model. An effective summary of the work flow involved in creating a model may include view-points from versions of the model that are earlier than the final version. Further, many prior techniques do not automatically generate the above described "fly-throughs," which may be helpful to users.

As the foregoing illustrates, what is needed in the art are techniques for showcasing authored views and for automatic generation of such authored views.

SUMMARY OF THE INVENTION

Embodiments described herein include a method, a computer-readable medium, and a system for managing authored views. The method includes displaying a main window including a model, an authoring panel configured for displaying authored view indicators associated with authored views of the model, and a navigation panel configured for displaying thumbnail representations of authored views associated with the model. The method also includes based on a user input, accessing an authored view of the model, wherein the authored view includes one of a view-point, a view path and a view surface. The method further includes displaying the authored view in the main window, an authored view indicator associated with the authored view in the authoring panel, and a thumbnail representation based on the authored view in the navigation panel. The computer-readable medium includes instructions that cause a processor to perform the method. The system includes a processor configured to perform the method.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1A:
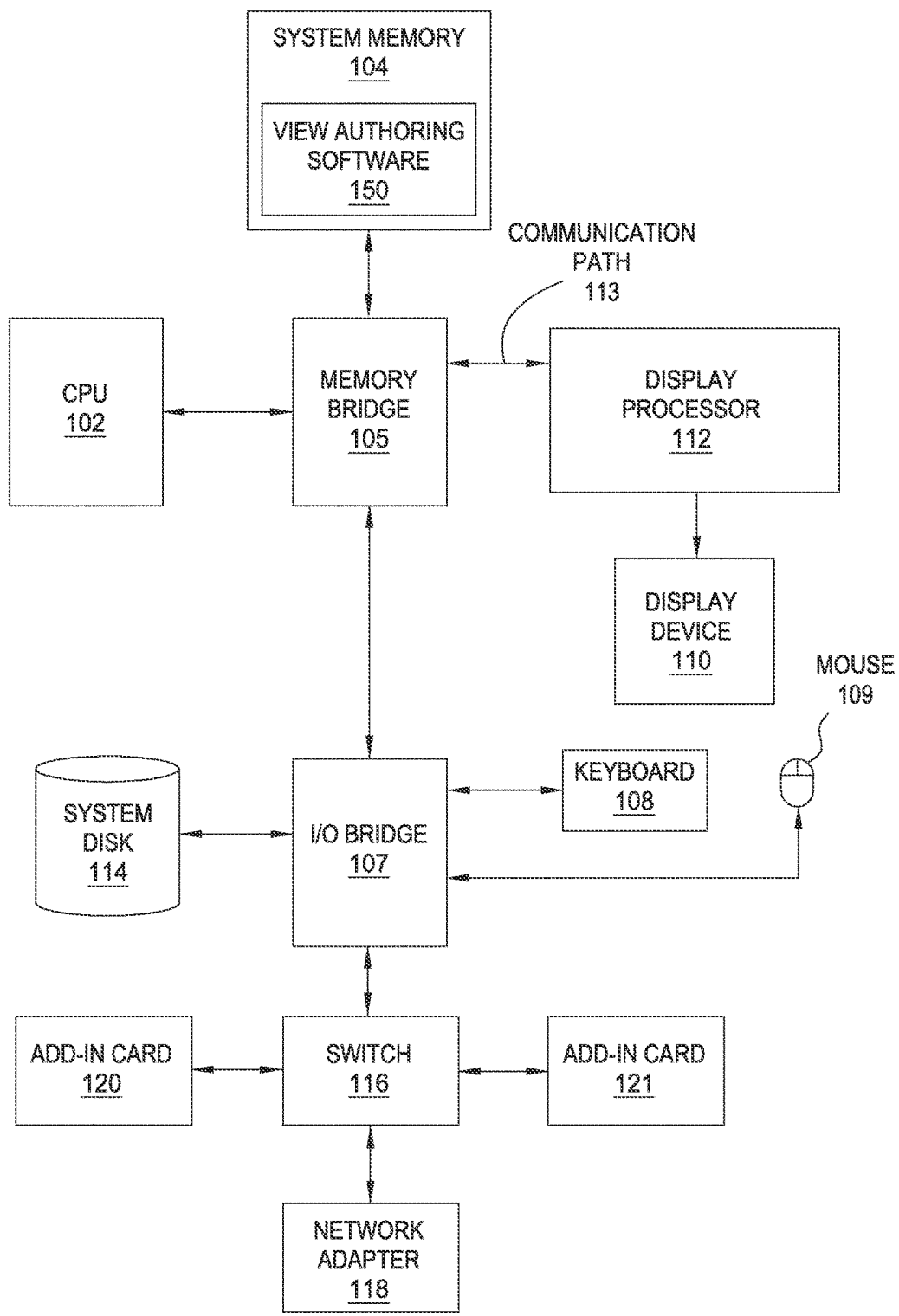
FIG. 1A is a block diagram of a system configured to implement one or more aspects of the present invention.

FIG. 1A is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

System memory stores view authoring software 150. View authoring software 150 is generally configured to provide functionality for authoring views and for viewing and editing authored views.

Figure 1B:
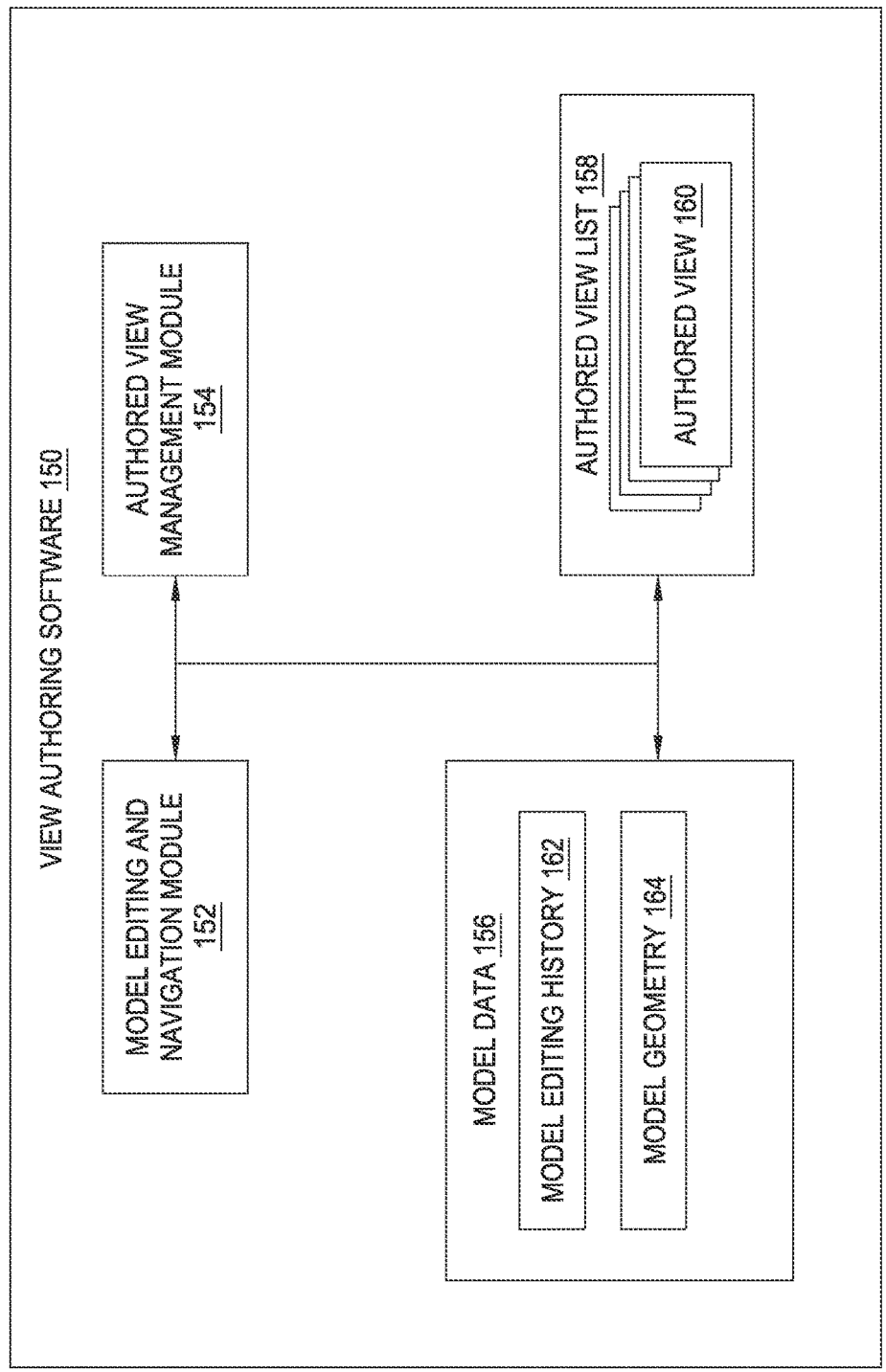
FIG. 1B is a more detailed block diagram of the view authoring software of FIG. 1A, according to one embodiment of the present invention.

FIG. 1B is a more detailed block diagram of the view authoring software 150 of FIG. 1A, according to one embodiment of the present invention. As shown, the view authoring software 150 includes a model editing and navigation module 152, an authored view management module 154, stored model data 156, and authored view list 158.

The model editing and navigation module 152 provides functionality for a user to create and navigate a model. In one example, the model editing and navigation module 152 provides functionality for a user to pan around a model, rotate around a model, zoom in or out from a model, and navigate a model in other ways. The model editing and navigation module 152 also includes functionality to allow a user to edit the model. Such editing may include a large variety of known techniques for editing a 3D model. Model editing and navigation module 152 generally stores and reads model data 156 while performing such editing and navigation.

The model data 156 includes model editing history 162 and model geometry 164. Model geometry 164 generally includes information about the shape of the model, which may, for example, describe a 3D mesh including triangles, vertices, and the like. Model editing history 162 generally includes a history of all edit operations (for example, "brush strokes" that affect the shape of the model) and all camera manipulations. Camera manipulations generally include a set of cameras that describe the position, view direction, and up-direction (i.e., the orientation of the camera in the sense of which direction is "up") for the camera. Camera manipulations also include camera movements, which include various known operations such as pans, zooms, rotations, and the like. The model data 156 also includes version data that describes various "versions" of a model. As is described in more detail below, these versions generally include "incarnations" of a model that represent the way the model existed at different stages during the editing of the model.

The authored view management module 154 manages the authored view list 158. Generally, the authored view list 158 stores a series of authored views 160 (discussed in further detail below), each of which represents a prescribed manner in which a model is displayed. The authored view management module 154 provides functionality for allowing a user to select a particular authored view 160 for viewing and also provides functionality for viewing a particular model according to that particular view. The authored view management module 154 also provides functionality for generating authored views 160 for viewing at a later time and for editing authored views 160.

Each authored view 160 generally constitutes a view surface, a view-point, or a view path. A view surface is a surface that constrains the camera while a user is viewing the model. A view-point is simply a prescribed point and associated direction at which a camera will be placed and directed when that view-point is selected for viewing the model. A view path is a path (and associated series of directions) along which a camera can be "scrubbed" (or moved) when that particular view path is selected for viewing the model.

For convenience, authored view management module 154 may allow a user to quickly scroll through a series of authored views 160. In one example, a user may scroll forwards through such a series of authored views 160 by hitting a certain keyboard key and may scroll backwards through such a series by hitting a different keyboard key.

Figure 2:
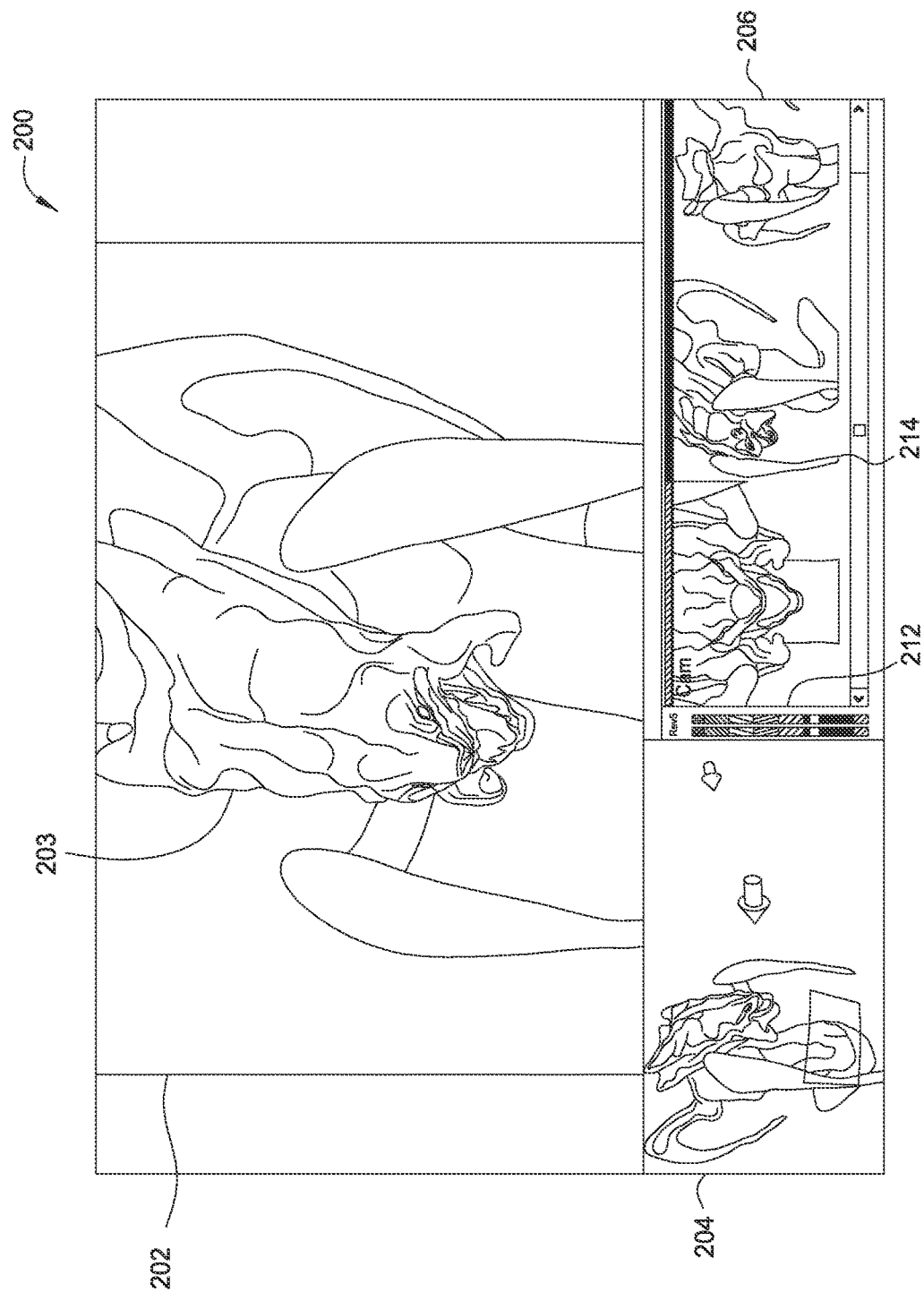
FIG. 2 is an illustration of an interface for creating and editing view-points, view paths, and view surfaces that is generated and displayed by the view authoring software of FIG. 1A, according to one embodiment of the invention.

FIG. 2 is an illustration of an interface 200 for creating and editing view-points, view paths, and view surfaces that is generated and displayed by the view authoring software 150 of FIG. 1A, according to one embodiment of the invention. As shown, the interface 200 includes a main window 202, an authoring panel 204, and a navigation panel 206. In general, the main window 202 displays a particular model 203 in detail, while the authoring panel 204 and navigation panel 206 providing functionality for selecting between authored views 160.

The main window 202 is an area that displays a model 203 and that allows a user to inspect and edit that model 203 in detail. The authoring panel 204 is an area that displays indicators of authored views 160 corresponding to the model 203. As described above, authored views 160 include (and thus each authored view may comprise any of) view-points, view paths, and view surfaces. The authored views 160 represented in authoring panel 204 are displayed as indicators in particular shapes—arrows, surfaces, and strips. View-points appear as arrows, view paths appear as strips and view surfaces appear as surfaces that may be curved.

The navigation panel 206 displays, for each authored view 160, a thumbnail representation of the model 203 in terms of how the model 203 would be shown from the particular authored view 160. The navigation panel 206 also displays a version slider 212 that allows a user to modify the version of the model 203 that is currently being displayed. Each of the main window 202, the authoring panel 204, and the navigation panel 206 are described in more detail below.

Figure 3:
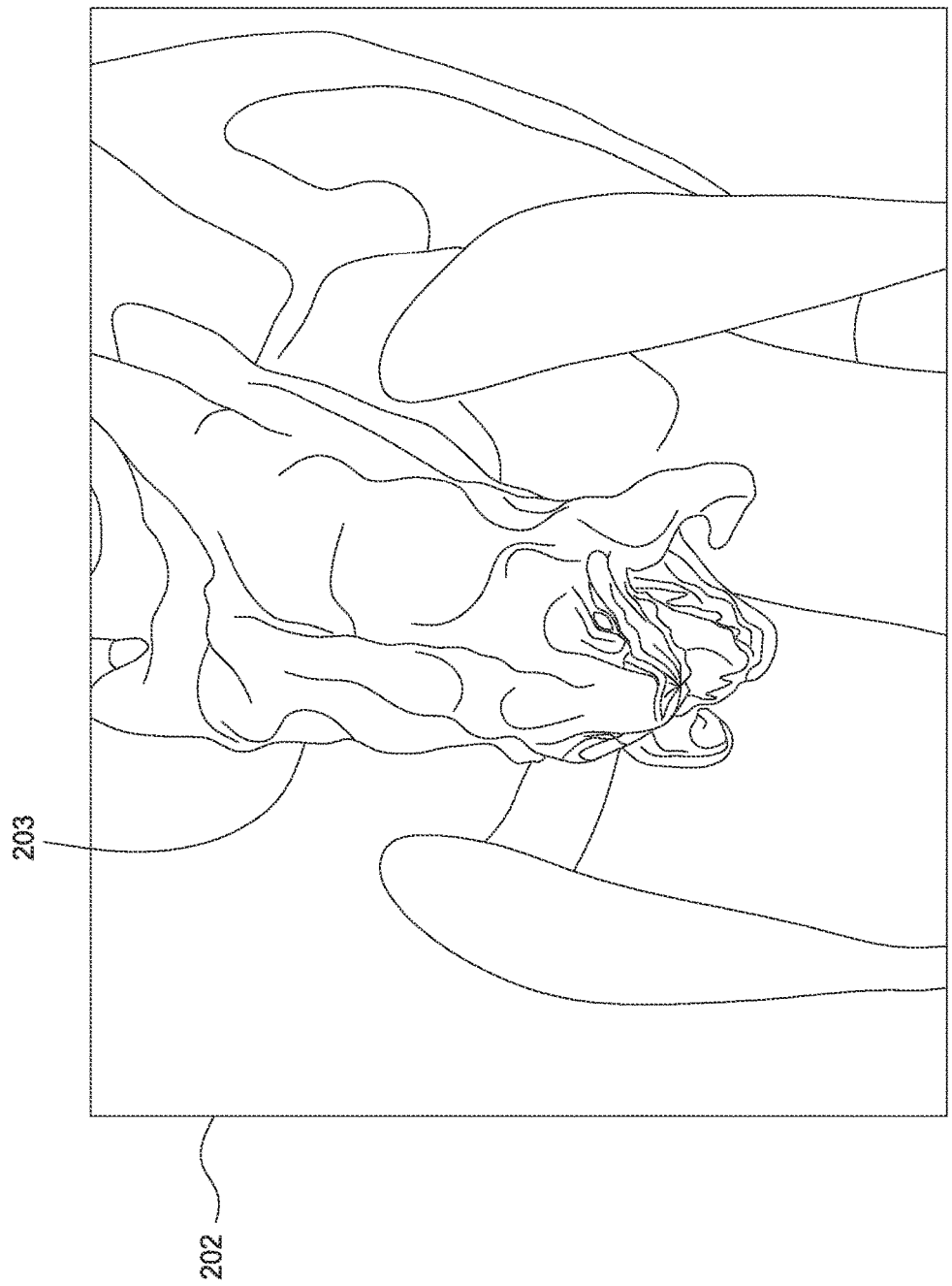
FIG. 3 illustrates in more detail the main window of the interface of FIG. 2, according to one embodiment of the present invention.

FIG. 3 illustrates in more detail the main window 202 of the interface 200 of FIG. 2, according to one embodiment of the present invention. As shown, the main window 202 displays a model 203 that is the subject of editing operations performed by a user. Prior to displaying the model 203 in the main window 202, view authoring software 150 may accept commands from a user that are configured to load a particular model 203. In response to those commands, view authoring software 150 would cause the model 203 to be displayed in the main window 202.

Figure 4:
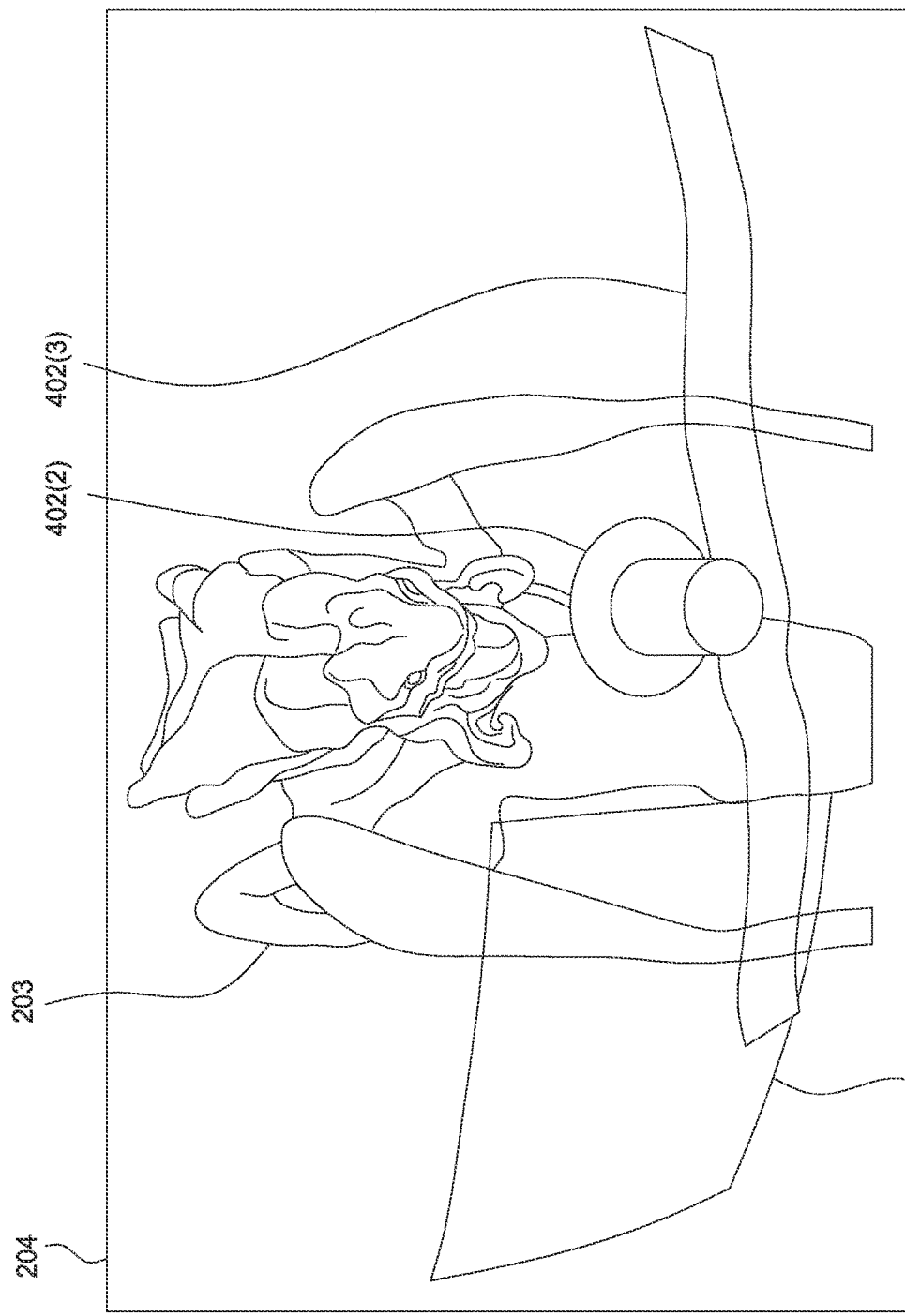
FIG. 4 illustrates in more detail the authoring panel of the interface of FIG. 2, according to one embodiment of the present invention.

FIG. 4 illustrates in more detail the authoring panel 204 of the interface of FIG. 2, according to one embodiment of the present invention. As shown, the authoring panel 204 displays authored view indicators 402 that correspond to the model 203 displayed in the main window 202. In some embodiments, authored view indicators 402 for all authored views 160 that have been authored for the model 203 displayed in the main window 202 are displayed within the authoring panel 204.

Each authored view indicators 402 may correspond to a different type of authored view 160. One authored view indicators 402(1) (also referred to herein as a "view surface representation") corresponds to a view surface type of authored view 160. Authoring panel 204 shows a view surface representation as a surface, as can be seen in FIG. 4. Another authored view indicator 402(2) (also referred to as a "view-point representation") corresponds to a view-point type of authored view 160. Authoring panel 204 shows a view-point representation as an arrow, as can be seen in FIG. 4. A further authored view indicators 402(3) (also referred to as a "view path representation") corresponds to a view path type of authored view 160. Authoring panel 204 shows a view path representation as a strip, as can be seen in FIG. 4.

Authored views 160 related to any of the authored view representations 402 displayed in the authoring panel 204 may be selected for view in the main window 202. In one embodiment, the view authoring software 150 selects a particular authored view 160 for display in the main window 202 when a user double-clicks on an associated authored view indicator 402. In other embodiments, other user interactions may cause the main window 202 to display a particular authored view 160, such as single clicking an authored view indicator 402, selecting an authored view indicator 402 with keyboard keys, and other user interactions.

Figure 5:
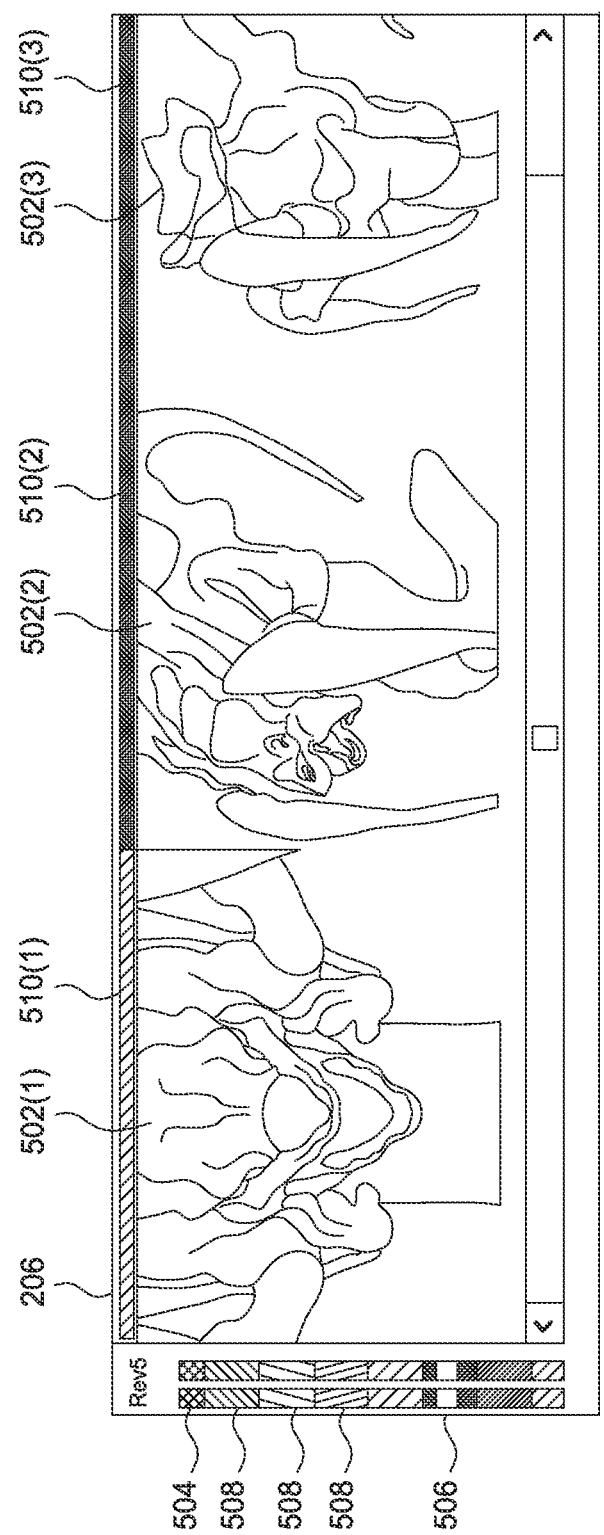
FIG. 5 illustrates in more detail the navigation panel of the interface of FIG. 2, according to one embodiment of the present invention.

FIG. 5 illustrates in more detail the navigation panel 206 of the interface 200 of FIG. 2, according to one embodiment of the present invention. The navigation panel 206 allows for selection of different authored views 160 based on thumbnail representations 502 of the authored views 160. The navigation panel 206 also includes a version slider 504. The version slider 504 allows selection of different version of the model 203.

The thumbnail representations 502 of authored views 160 each comprise a thumbnail image that shows what the model 203 would look like from the particular authored view 160 that is associated with a particular thumbnail representation 502. For example, thumbnail representation 502(1) is a thumbnail image associated with an authored view 160 that is directed towards the front of the model. Thumbnail representation 502(2) and thumbnail representation 502(3) are, similarly, associated with other authored views 160.

As stated above, the version slider 504 allows for selection of different versions of the model 203. A version refers to a specific "historical incarnation" of the model 203. For example, one version may be an incarnation of the model 203 as that model existed before the last 10 edits, and a second version may be an incarnation of the model 203 as the model exist before the last 20 edits. This version history is generally stored in the model data 156.

The version slider 504 may allow a user to change versions by sliding a selector 506 to different version indicators 508 along the version slider 504. More specifically, when a user drags the selector 506 to a different version indicator 508, the main window 202 selects and displays the version of the model 203 that is associated with the particular selected version indicator 508. In some embodiments, as the user drags the selector 506 through each version indicator 508, the main window 202 displays the model associated with each particular version indicator 508. Further, in some embodiments, each version indicator 508 may be a different color, which enhances the ability of a user to distinguish between version indicators 508.

Additionally, in some embodiments, the "age" of the version associated with any particular version indicator 508 is related to the position of the version indicator 508 in the version slider 504. In one example, a version of the model 203 associated with a version indicator 508 at the top of the version slider 504 is older than a version of the model 203 associated with a version indicator 508 at the bottom of the version slider 504.

A version stripe 510 is present above each thumbnail representation 502. Each version stripe 510 has visual characteristics that match the visual characteristics of the version indicator 508 that is associated with the thumbnail representation 502 below the particular version stripe 510. In one example, the version stripes 510 are colored and have the same color as the version indicator 508 that is associated with the thumbnail representation 502 under the version stripe 510.

Referring to both FIG. 4 and FIG. 5 together, both the navigation panel 206 and the authoring panel 204 display information related to authored views 160 and allow a user to navigation between authored views 160. However, the navigation panel 206 provides representative thumbnail images 502 ("thumbnail representations") while the authoring panel 204 exhibits better spatial context.

As previously stated, view authoring software 150 allows a user to create and modify authored views 160. Authored views may be altered for different versions. More specifically, each authored view may be associated with a different version of the model 203 stored in model data 156. Selecting or editing an authored view occurs for the version that is selected according to navigation panel 206.

View authoring software 150 allows for viewing authored views 160 in a comparison view mode. To enter a comparison view mode, view authoring software 150 accepts a particular associated input such as a single mouse click or series of mouse clicks or a single key press or a series of keyboard presses to cause the view authoring software 150 to enter the comparison view mode. In the comparison view mode, view authoring software 150 presents functionality to allow two (or more) versions of the model to be displayed for a particular authored view 160.

Figure 6:
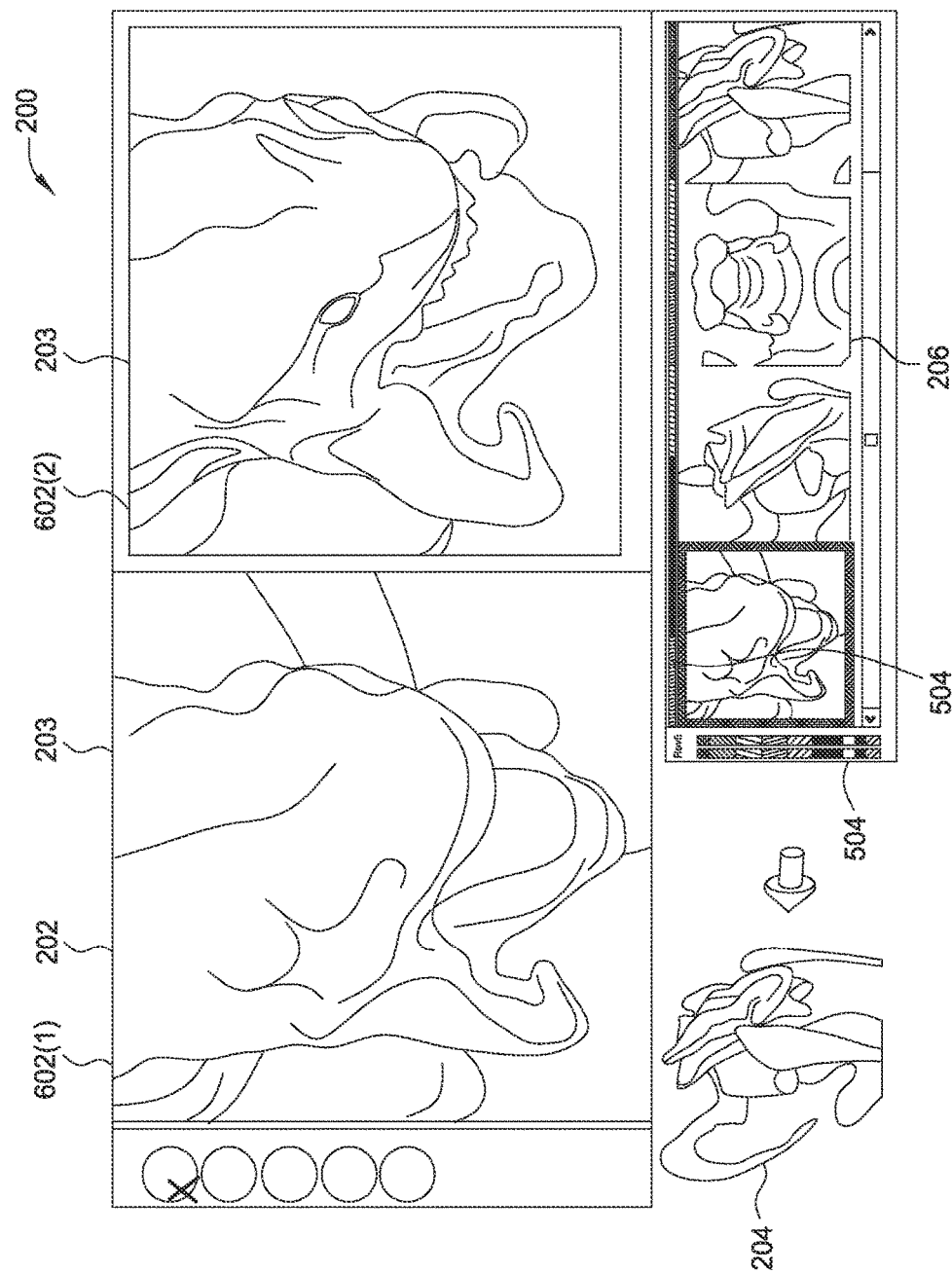
FIG. 6 illustrates the interface of FIG. 2 when the view authoring software of FIG. 1 is operating in comparison view mode, according to one embodiment of the present invention.

FIG. 6 illustrates the interface 200 of FIG. 2 when the view authoring software 150 of FIG. 1 operating in comparison view mode, according to one embodiment of the present invention. As shown, the interface 200 includes the main window 202, the authoring panel 204, and the navigation panel 206, all operating in comparison view mode.

More specifically, in comparison view mode, the main window 202 displays two versions of the model 203—a first version 203(1) and a second version 203(2) in two different version panes 602—version pane 602(1) and version pane 602(2). Although two versions are illustrated, those of skill in the art will recognize that any number of versions, such as eight, could be displayed. The two versions are selected based on the slider 504 of the navigation panel 206. More specifically, upon receiving an input such as a key press or mouse click, the view authoring software 150 selects a particular version pane 602 for version selection. Then, upon receiving an input related to the version slider 504, such as dragging the slider, the view authoring software 150 updates the version associated with the selected version pane 602, based on the chosen version. The view authoring software 150 may "save" a particular comparison view as an authored view 160 into the authored view list 158.

Authoring panel 204 displays saved comparison views in a similar manner as with non-comparison view authored views. For example, view-points are shown with an arrow, view paths are shown as a strip, and view surfaces are shown as a surface, as in FIG. 4. Each of these comparison authored views may also display a visual indication that the authored view 160 is a comparison view. For example, an authored view 160 that is a comparison view may be displayed in two colors, where a first color is associated with a first version that is associated with the authored comparison view and a second color is associated with a second version that is associated with the authored comparison view.

Navigation panel 206 also displays saved comparison views in a similar manner as with non-comparison view authored views. One difference, however, is that above each thumbnail representation 502, navigation panel 206 displays a version stripe 510 that includes an indication of each version associated with the comparison view that is displayed in the thumbnail representation 502. In one example, the version stripe 510 includes a first color that is associated with a first version associated with the thumbnail representation 502 below the particular version stripe 510 and also includes a second color that is associated with a second version associated with the thumbnail representation 502 below the particular version stripe 510.

View authoring software 150 may of course display the comparison views. When displaying a comparison view, view operations, such as scrubbing through the comparison view, are applied to both version panes 602 so that the two different versions of the model 203 are displayed in a synchronized manner.

Several techniques are now presented for creating and editing authored views 160, including view-points, view paths, and view surfaces. The techniques may include manual or automatic features and thus may be manual, or may be partially or fully automatic. For each of these techniques, reference may be made to any of FIGS. 2-5.

As described above, view authoring software 150 allows a user to create view-points. View-points may be created manually, created automatically, or may be initialized automatically and then modified by a user.

To automatically create view-points, view authoring software 150 may accept a particular user input such as a keyboard or mouse input designated to request automatic generation of view-points. In response to receiving such input, view authoring software 150 automatically generates and displays suggested view-points from which a user may choose one or more to add to authored view list 158. View authoring software 150 may display such suggested view-points in the form of a series of thumbnail representations that are similar to the thumbnail representations 502 of FIG. 5. In some embodiments, view authoring software 150 displays these thumbnail representations within a window that is displayed on screen. Upon receiving user input such as a mouse click targeted at a particular thumbnail representation or a certain keyboard input, view authoring software 150 adds the view-point associated with the targeted thumbnail representation into the authored view list 158. In one example, upon detecting that a user has right-clicked on the thumbnail representation, view authoring software 150 displays a pop-up menu that presents certain operations to the user. Upon detecting that a user has selecting an operation to add the associated view-point to the authored view list 158, view authoring software 150 adds the particular view-point to the authored view list 158.

Although any known technique may be implemented for automatically generating the view-points, one example technique is now provided. This example technique is based on a spatial clustering routine and generates view-points referred to herein as "sculpting views." According to this technique, view authoring software 150 begins with a set of "sculpting cameras" that are recorded in model editing history 162. "Sculpting cameras" are cameras during which at least one edit operation is performed on a model. The set of cameras may be automatically chosen by the view authoring software 150 and may include all sculpting cameras in a particular model editing history 162 or may be restricted based on one or more features. As described above, each camera that is recorded in the model editing history 162 generally comprises a position and orientation for a camera during a period in which editing operations are being performed on the model 203. For example, if the camera were positioned at a first position and oriented in a first orientation when a user performed one or more edits to the model 203, then that first position and first orientation are stored as a camera in the model editing history 162.

To apply the spatial clustering routine, the authored view management module 154 builds an octree spatial decomposition with the sculpting cameras included in the model editing history 162. The octree spatial decomposition recursively partitions the 3D coordinate space encompassing the model 203 into increasingly granular cells. The cells each include some portion of the 3D coordinate space that includes the model 203. Each parent cell of the octree spatial decomposition can include eight child cells of greater granularity than the parent cell. The portion of the 3D coordinate space included within a particular child cell is also included in the less granular parent cell of the child cell. In addition to being a child cell, a cell may also be a parent cell to a group of smaller child cells of even greater granularity. The smallest cells in the octree spatial decomposition are referred to as "leaf cells" and do not include any child cells.

As described above, each camera stored in the model editing history 162 includes a position—a set of coordinates within the 3D coordinate space. Thus, each camera is also included in the 3D coordinate space assigned to a particular leaf cell. Each camera is also included in a series of increasingly less granular parent cells that include increasingly larger portions of the 3D coordinate space encompassing the leaf cell. For each camera in the chosen set of cameras, the authored view management module 154 matches a leaf cell with that particular camera, which means that the camera is also associated with one or more parent cells. This structure of parent cells, leaf cells, and associated cameras comprises the octree spatial decomposition.

After building the octree spatial decomposition, the authored view management module 154 determines the accumulated camera time of each cell and the total accumulated camera time of all the cameras included in the set of cameras. The authored view management module 154 determines accumulated camera time for each cell by summing elapsed time of each camera included in the cell. An elapsed time is stored in the model editing history 162 and generally constitutes the amount of time spent in a particular camera, as recorded in the model editing history 162. The total accumulated camera time is the total amount of time spent in all cameras in the set of cameras. The authored view management module 154 determines a dominant cell based on the summed elapsed times. More specifically, the authored view management module 154 determines a dominant cell as the most granular cell with an accumulated camera time that is at least a threshold percentage of the total accumulated camera time. In some embodiments, this threshold percentage may be 70%.

Once the dominant cell is determined, the authored view management module 154 calculates a weighted average center location of the cameras within the dominant cell. The weighted average center may be weighted by the elapsed times for the cameras in the dominant cell. Finally, the authored view management module 154 selects the camera closest to the weighted average center location. This selected camera is the automatically generated authored view-point discussed above.

As described above, the view-point that is chosen is based on a set of cameras that are chosen. Different view-points may thus be created by varying the set of chosen cameras. For example, cameras may be restricted (from, e.g., all cameras that are saved in model editing history 162 for a particular model 203) based on a range of times, based on a range of locations (e.g., a bounding box) or based on other factors.

As an alternative to the operation of directly adding a view-point that is automatically generated to the authored view list 158, view authoring software 150 may provide functionality for allowing a user to select one of the automatically generated view-points for manual modification. This functionality is referred to herein as "assisted view-point authoring." More specifically, view authoring software 150 would generate a set of automatically generated view-points and present those view-points to the user. Upon receiving appropriate input (keyboard or mouse input) that targets a particular view-point from those presented for modification, the view authoring software 150 would present that particular view-point to the user and not store that view-point in the authored view list 158. The view authoring software 150 would then allow a user to modify the view-point—for example, by panning, rotating, zooming, or the like. Then, when the view authoring software 150 receives appropriate user input for saving the current camera characteristics, view authoring software 150 stores the current camera characteristics as a view-point in the authored view list 158.

In addition to the automatic or assisted view-point authoring described above, view authoring software 150 also provides functionality for allowing a user to directly create an authored view 160 without assistance from automatically generated view-points. More specifically, as described above, model editing and navigation module 152 displays a model 203 in main window 202 and allows the camera with which the model is viewed to be modified by panning, rotating, zooming, and by performing other operations. In response to a particular input (such as pressing a particular key on a keyboard), the view authoring software 150 records the current camera view that is displayed in the main window 202 as an authored view 160 of the view-point type. This recorded view-point has the same camera position and position of the current camera view with which the model 203 is displayed in the main window 202.

View authoring software 150 also provides functionality for automatically creating region-specific view-points. More specifically, view authoring software 150 provides functionality for allowing a user to select a particular region of the model 203 and to associate a view-point with that region. A region generally constitutes a number of nearby triangles of the mesh that defines the model 203.

To create a region-specific view-point, view authoring software 150 allows a user to select a region of the model 203 by, for example, "brushing over" a set of vertices or triangles of the model 203. View authoring software 150 then restricts the portion of the model editing history 162 that is analyzed to generate the view-point to the portion of model editing history 162 that is associated with the particular region that is selected by a user. For example, the cameras stored in the model editing history 162 that are analyzed may be restricted to only those cameras that were being viewed with when the selected region was edited based on the model editing history 162. As with the techniques described above, authored view management module 154 may generate view-points based on this restricted set of cameras and present those view-points to the user for selection. Authored view management module 154 accepts input from a user that requests recording one of the displayed view-points in authored view list 158 and in response displays and/or saves the selected view-point.

View authoring software 150 also provides functionality for authoring region-specific view paths and view surfaces. More specifically, view authoring software 150 accepts input from a user for selecting a particular region of the model 203. Based on the selected region, view authoring software 150 generates a set of suggested view paths and view surfaces based on the editing history of the model 203. View authoring software 150 displays these suggested view paths and view surfaces and allows a user to select one or more for addition to authored view list 158.

Authored view management module 154 includes functionality for automatically creating view paths upon request by a user. One example of a technique for such automatic creation is now provided.

According to this technique, authored view management module 154 finds both sculpting views and inspection views for a particular model 203. Sculpting views are generated as described above and generally comprise views that a user was in when performing edits to the model 203. Authored view management module 154 finds sculpting views as described above with respect to automatic generation of view-points. Inspection views generally comprise views that are representative of user camera modifications that occur between edits to a model 203. Such inspection views are generally associated with camera "oscillations," whereby a user performs an edit or series of edits to a model 203, "swings" the camera to a different location in order to inspect the model 203 from a different angle, and then "swings" the camera back to the original location after completing the inspection of the model.

Figure 7:
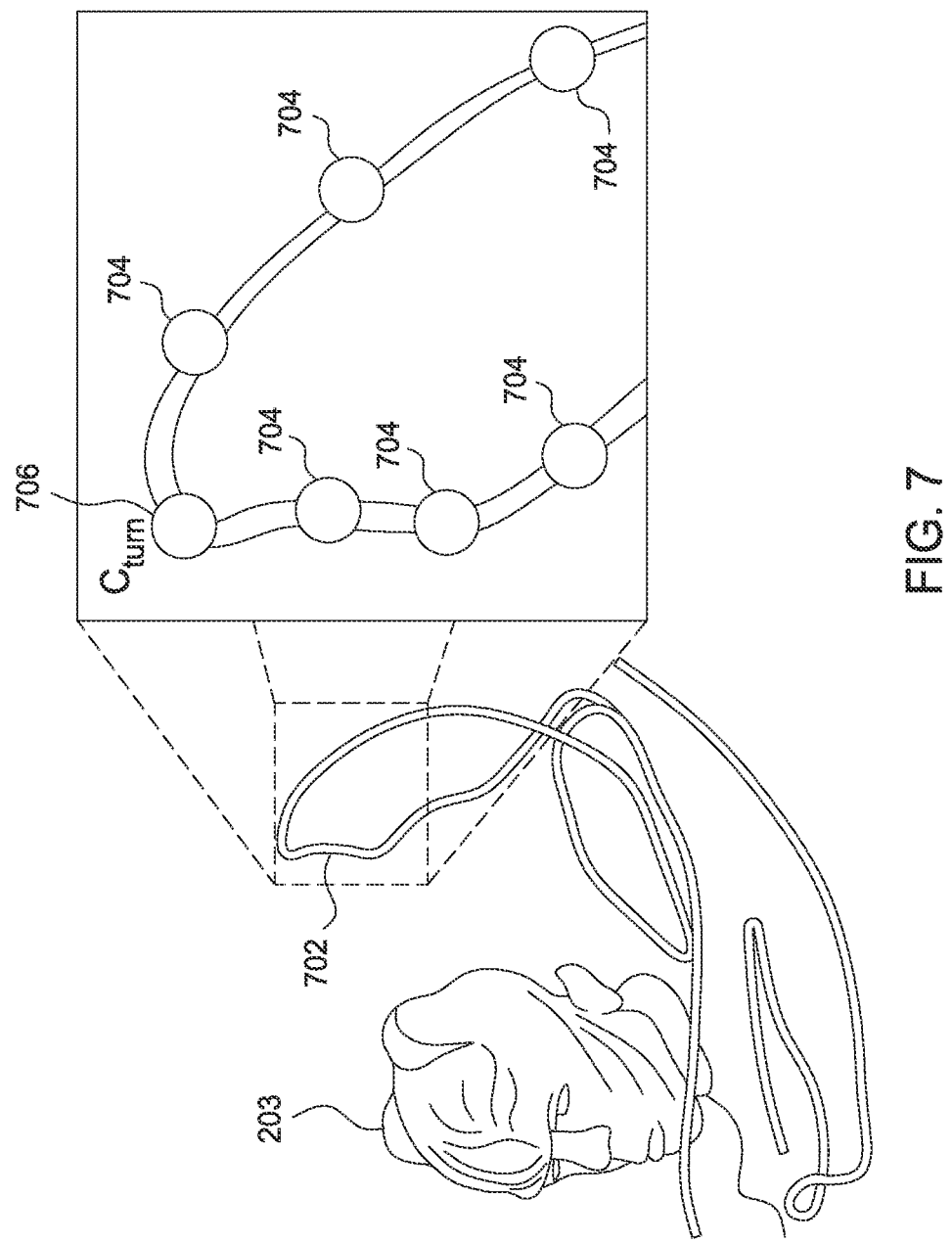
FIG. 7 illustrates an inspection view generated and displayed for a 3D model, according to one embodiment of the invention.

FIG. 7 illustrates an inspection view for a 3D model, according to one embodiment of the invention. As shown, the camera history 702 generally comprises a series of cameras 704 that are recorded as a user is editing the model 203 and stored in model editing history 162.

To generate an inspection view, authored view management module 154 identifies a turning point 706. A turning point is the point within a particular camera path 702 that has the highest opening angle between two different sculpting views. In FIG. 7, point 706 is the turning point in the camera history 702.

View management module 154 identifies each turning point associated with a given region. Multiple turning points may exist because multiple "camera oscillations" between sculpting cameras may exist. Again, for region-specific authored view generation, cameras in the model editing history 162 are restricted based on which cameras were being viewed with when the portion of the model defined by the region was being editing according to the editing history 162. Once each turning point is identified, view management module 154 performs the spatial clustering technique described above. Specifically, view management module 154 performs the octree spatial decomposition to identify a cell that has greater than a threshold amount of camera time. Finally, view management module 154 calculates a weighted average center position based on the turning points within the identified cell and identifies the turning point closest to that weighted average center position as the inspection view.

View management module 154 identifies the camera history 702 associated with the turning point 706 as the automatically generated view path. More specifically, the identified view path constitutes the recorded camera movements from a sculpting view prior to the turning point 706 (inspection view), through the turning point 706 (inspection view), and to the next sculpting view.

View management module 154 also automatically identifies region-specific view surfaces. One example technique is now provided. First, for the selected region of the model 203, view management module 154 identifies the average center of the vertices of the model 203 within the region. Subsequently, view management module 154 identifies the sculpting cameras (described above) and the sculpting views (also described above). Subsequently, view management module 154 calculates a sphere with a center at the average center of the vertices of the model 203 within the selected region and with a radius as the distance between the sculpting view and the average center of the vertices of the model 203 within the region. View management module 154 calculates a 3D frustum originated at the center of the vertices of the model 203 within the region and having as cover the sculpting cameras. View management module 154 calculates the view surface as the intersection between the sphere and the view frustum.

Either view paths or view surfaces may be modified. To modify a view path, a user may click and drag a mouse (or perform other suitable input). In one embodiment, dragging along one axis such as the x-axis trims the head of the 3D path, and dragging along the y-axis trims the tail of the 3D path. Another input such as a right-click drag translates the path based on the drag direction. To modify a view surface, a user may click and drag a mouse (or perform other suitable input). In one embodiment, dragging along the x-axis modifies the horizontal spanning angle of the view surface and dragging along the y-axis modifies the vertical spanning angle of the view surface.

Figure 8:
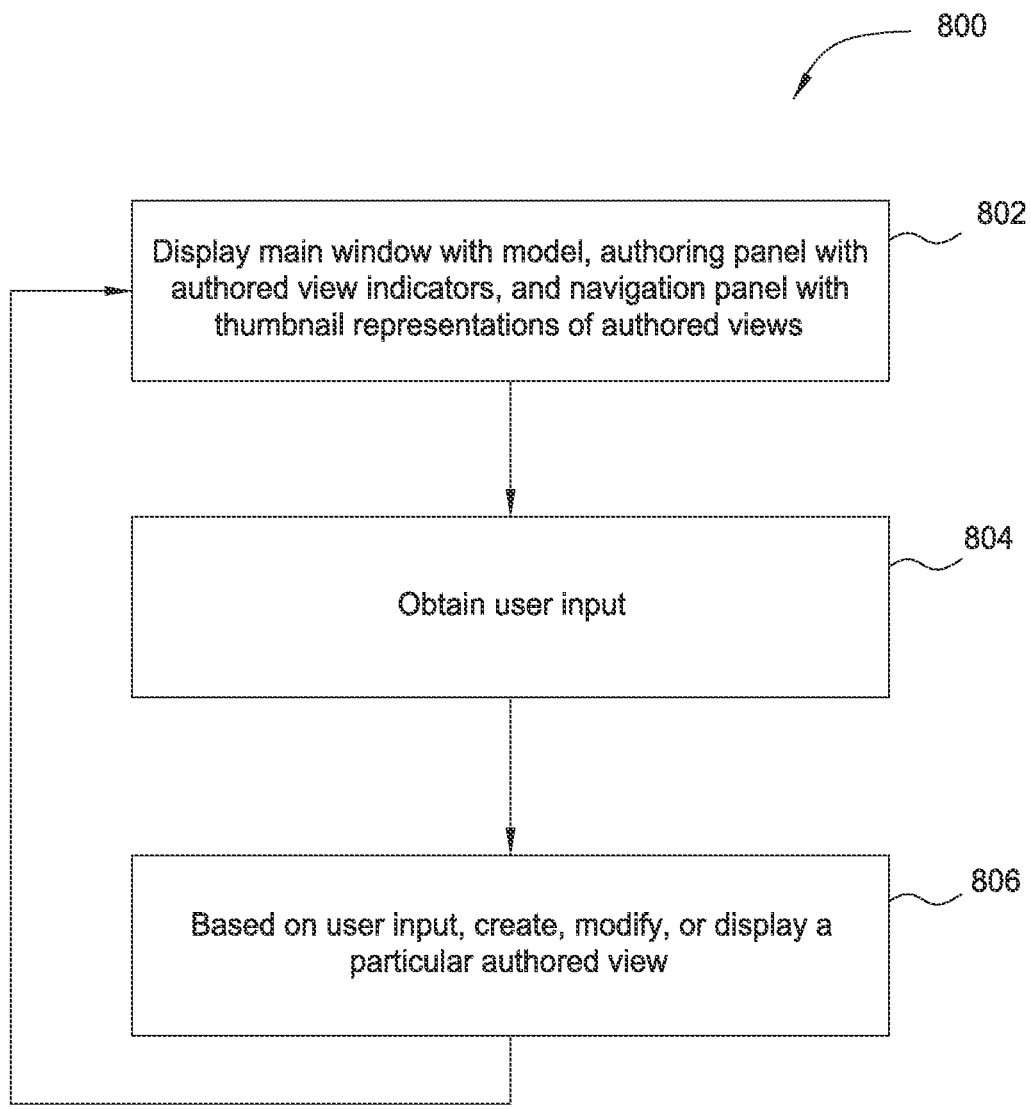
FIG. 8 is a flow diagram of method steps for generating and displaying authored views, according to one embodiment of the present invention.

FIG. 8 is a flow diagram of method steps for generating and displaying authored views, according to one embodiment of the present invention. Although the method steps are described in conjunction with the system of FIGS. 1-7, persons skilled in the art will understand that any system configured to perform the method steps, in any order, falls within the scope of the present invention.

As shown, a method 800 begins at step 802, where view authoring software 150 displays a main window 202 with a model 203, an authoring panel 204 with authored view indicators 402 and a navigation panel 206 with thumbnail representations 502 of authored views 160. As described above, the model 203 generally constitutes a model of triangles and vertices for editing by a user. The authored view indicators 402 are representations of authored views 160, which generally constitute a prescribed manner in which to view the model 203. The thumbnail representations 502 are generally images of the model 203 as the model 203 would be shown based on a particular authored view 160 associated with that thumbnail representation 502.

At step 804, view authoring software 150 accepts user input. The user input may request one of a variety of operations such as changing the current view of the model, recalling an authored view 160, editing an authored view 160, requesting automatic generation of an authored view 160, or the like. At step 806, in response to the user input, view authoring software 150 performs appropriate steps such as creating, modifying, or displaying a particular authored view. For example, view authoring software 150 may recall a particular authored view based on a selection within authoring panel 204 or navigation panel 206. View authoring software 150 may also generate and present a series of suggested authored views 160 to the user. View authoring software 150 may also edit an already stored authored view 160.

Figure 9:
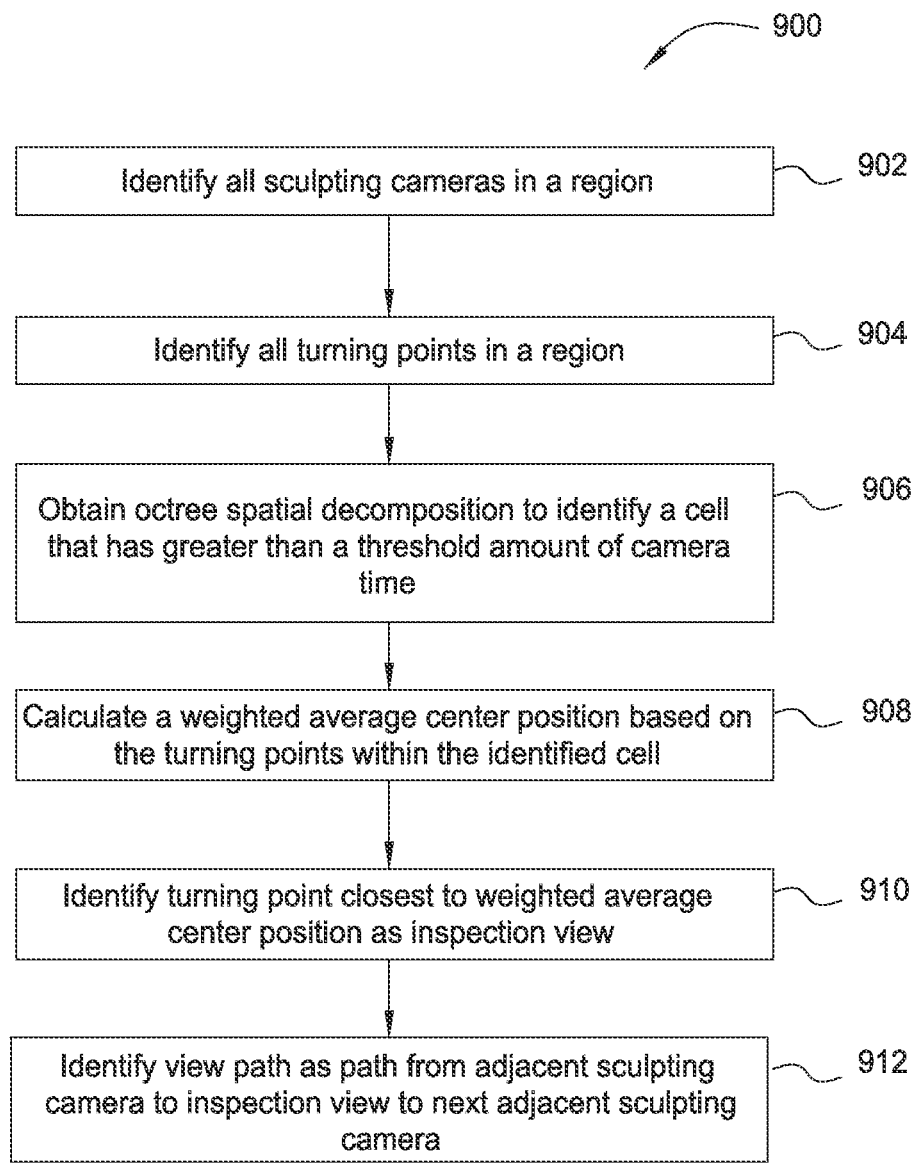
FIG. 9 is a flow diagram of method steps for generating view paths, according to one embodiment of the present invention.

FIG. 9 is a flow diagram of method steps for generating view paths, according to one embodiment of the present invention. Although the method steps are described in conjunction with the system of FIGS. 1-7, persons skilled in the art will understand that any system configured to perform the method steps, in any order, falls within the scope of the present invention.

As shown, a method 900 begins at step 902, where view authoring software 150 identifies all sculpting cameras in a selected region. At step 904, view authoring software 150 identifies all turning points in a region. At step 906, view authoring software 150 obtains an octree spatial decomposition to identify a cell that has greater than a threshold amount of camera time. At step 908, view authoring software 150 calculates a weighted average center position based on the turning points within the identified cell. At step 910, view authoring software 150 identifies the turning point that is closest to the weighted average center position as the inspection view. At step 912, view authoring software identifies a view path as a path from an adjacent sculpting camera to the inspection view to the next adjacent sculpting camera.

Figure 10:
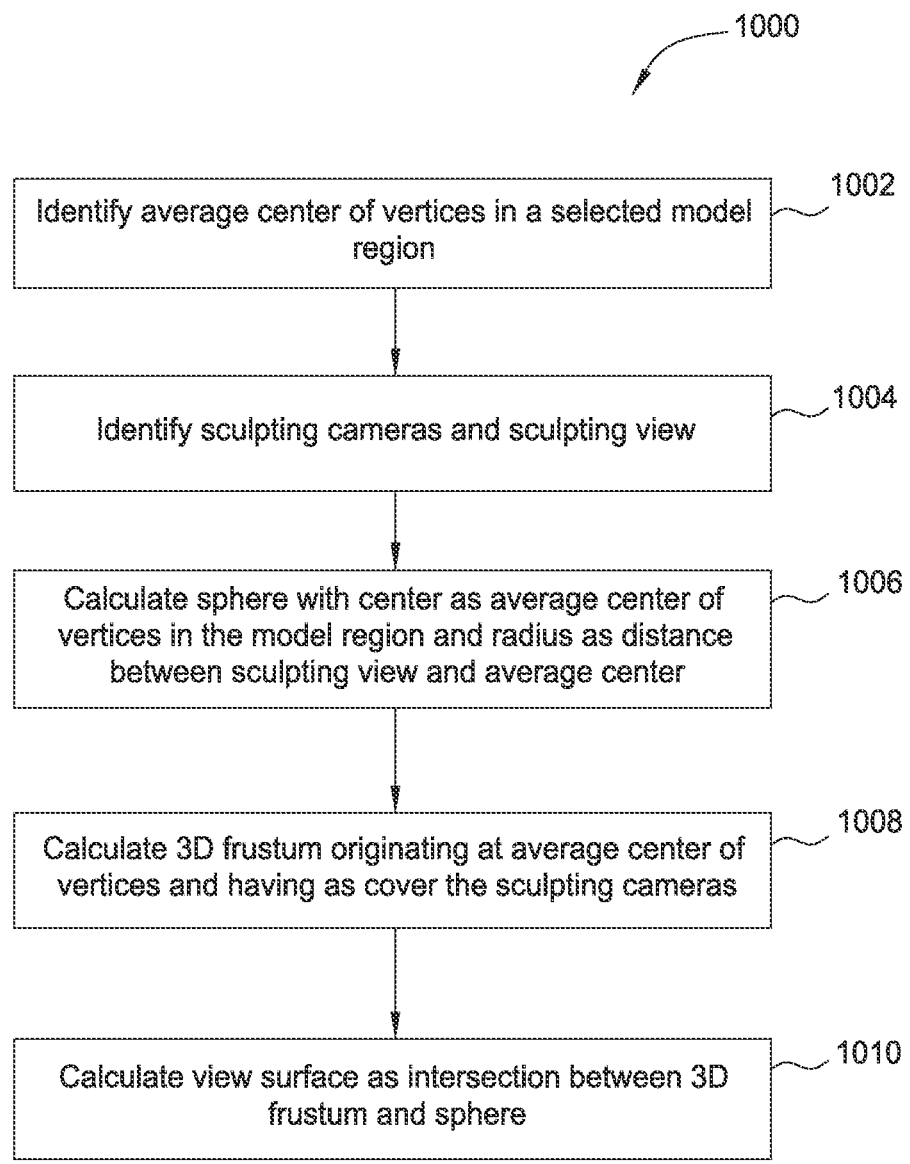
FIG. 10 is a flow diagram of method steps for generating view surfaces, according to one embodiment of the present invention.

FIG. 10 is a flow diagram of method steps for generating view surfaces, according to one embodiment of the present invention. Although the method steps are described in conjunction with the system of FIGS. 1-7, persons skilled in the art will understand that any system configured to perform the method steps, in any order, falls within the scope of the present invention.

As shown, a method 1000 begins at step 1002, where view authoring software 150 identifies an average center of vertices in a selected model region. At step 1004, view authoring software 150 identifies sculpting cameras and a sculpting view for the region. At step 1006, view authoring software 150 calculates a sphere with a center as the average center of vertices in the model region and with a radius a the distance between the sculpting view and the average center. At step 1008, view authoring software 150 calculates a 3D frustum that originates at the average center of vertices and has as cover the sculpting cameras. At step 1010, view authoring software calculates the view surfaces as the intersection between the 3D frustum and the sphere.

In sum, view authoring software 150 is disclosed herein that presents a useful interface to a user that includes a main window for viewing and editing a model as well as a navigation panel and an authoring panel, both for viewing and authoring views for viewing the model. The authoring panel depicts authored views as authored view indicators that show that type and position of an authored view in three-dimensional space. The navigation panel depicts thumbnails that depict the model as seen from each of the authored views. View authoring software 150 also includes techniques for automatically generating view-points, view paths, and view surfaces for suggestion to a user.

One advantage of the disclosed techniques is that a convenient and simple interface is provided to a user for viewing and editing authored views. Such a simple and convenient interface improves the ability of users to navigate and edit authored views, which improves the ability to showcase particular three-dimensional models. Another advantage is that techniques for automatically generating authored views are provided. Such automatic-generation techniques reduce the amount of time for users to create authored views, as the users are able to simply choose from a set of suggested views.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What we claim is:

1. A method for managing authored views, the method comprising:
    displaying a main window including a model, an authoring panel configured for displaying authored view indicators associated with authored views of the model, and a navigation panel configured for displaying thumbnail representations of authored views associated with the model;
    based on a user input, automatically generating a new authored view of the model, wherein the new authored view includes one of a view-point, a view path and a view surface; and
    displaying the new authored view in the main window, a first authored view indicator associated with the new authored view in the authoring panel, and a first thumbnail representation based on the new authored view in the navigation panel.

2. The method of claim 1, wherein the user input is associated with recalling a first authored view, and automatically generating the new authored view comprises generating new data for display based on the user input and the first authored view.

3. The method of claim 1, wherein:
    the user input comprises an access of the first authored view indicator within the authoring panel; and
    automatically generating the new authored view comprises generating new data for display based on an authored view that is associated with the first authored view indicator.

4. The method of claim 1, wherein:
    the user input comprises an access of the first thumbnail representation within the navigation panel; and
    automatically generating the new authored view comprises generating new data for display based on an authored view that is associated with the first thumbnail representation.

5. The method of claim 1, wherein the user input is associated with changing a first authored view, and automatically generating the new authored view comprises generating new data for display based on the user input and the first authored view.

6. The method of claim 1, wherein:
    the user input is further associated with automatically generating a view-point; and
    automatically generating the new authored view comprises generating the view-point based on model editing history associated with the model.

7. The method of claim 1, wherein:
    the user input is further associated with automatically generating a view path; and
    automatically generating the new authored view comprises generating the view path based on model editing history associated with the model.

8. The method of claim 1, wherein:
    the user input is further associated with automatically generating a view surface; and
    automatically generating the new authored view comprises generating the view surface based on model editing history associated with the model.

9. The method of claim 1, wherein
    the user input is further associated with manually generating a view-point; and
    automatically generating the new authored view comprises generating the view-point based on a user selection of an authored view.

10. A non-transitory computer-readable medium storing instructions that, when executed by a processor, cause the processor to perform a method for managing authored views, the method comprising:
    displaying a main window including a model, an authoring panel configured for displaying authored view indicators associated with authored views of the model, and a navigation panel configured for displaying thumbnail representations of authored views associated with the model;
    based on a user input, automatically generating a new authored view of the model, wherein the new authored view includes one of a view-point, a view path and a view surface; and
    displaying the new authored view in the main window, a first authored view indicator associated with the new authored view in the authoring panel, and a first thumbnail representation based on the new authored view in the navigation panel.

11. The non-transitory computer-readable medium of claim 10, wherein the user input is associated with recalling a first authored view, and automatically generating the new authored view comprises generating new data for display based on the user input and the first authored view.

12. The non-transitory computer-readable medium of claim 10, wherein:
the user input comprises an access of the first authored view indicator within the authoring panel; and
automatically generating the new authored view comprises generating new data for display based on an authored view that is associated with the first authored view indicator.

13. The non-transitory computer-readable medium of claim 10, wherein:
the user input comprises an access of the first thumbnail representation within the navigation panel; and
automatically generating the new authored view comprises generating new data for display based on an authored view that is associated with the first thumbnail representation.

14. The non-transitory computer-readable medium of claim 10, wherein the user input is associated with changing a first authored view, and automatically generating the new authored view comprises generating new data for display based on the user input and the first authored view.

15. The non-transitory computer-readable medium of claim 10, wherein:
the user input is further associated with automatically generating a view-point; and
automatically generating the new authored view comprises generating the view-point based on model editing history associated with the model.

16. The non-transitory computer-readable medium of claim 10, wherein:
the user input is further associated with automatically generating a view path; and
automatically generating the new authored view comprises generating the view path based on model editing history associated with the model.

17. The non-transitory computer-readable medium of claim 10, wherein:
the user input is further associated with automatically generating a view surface; and
automatically generating the new authored view comprises generating the view surface based on model editing history associated with the model.

18. The non-transitory computer-readable medium of claim 10, wherein:
the user input is further associated with manually generating a view-point; and
automatically generating the new authored view comprises generating the view-point based on a user selection of an authored view.

19. A system for managing authored views, the system comprising:
a processor configured to:
display a main window including a model, an authoring panel configured for displaying authored view indicators associated with authored views of the model, and a navigation panel configured for displaying thumbnail representations of authored views associated with the model;
based on a user input, automatically generate a new authored view of the model, wherein the new authored view includes one of a view-point, a view path and a view surface; and
display the new authored view in the main window, a first authored view indicator associated with the new authored view in the authoring panel, and a first thumbnail representation based on the new authored view in the navigation panel.

20. The system of claim 19, wherein:
the user input is associated with recalling a first authored view; and
automatically generating the new authored view comprises generating new data for display based on the user input and the first authored view.

* * * * *